United States Patent [19]

Lindorfer et al.

[11] 4,437,993

[45] Mar. 20, 1984

[54] PREVENTION OF PENETRATION OF OILY HYDROCARBONS INTO SAND

[75] Inventors: Walter Lindorfer, Kassel; Fritz Wagner, Stockheim; Walther Schulz, Vechta, all of Fed. Rep. of Germany

[73] Assignees: Wintershall AG, Kassel; Gesellschaft fur Biotechnologische Forschung mbH, Brunswick, both of Fed. Rep. of Germany

[21] Appl. No.: 303,996

[22] Filed: Sep. 21, 1981

[30] Foreign Application Priority Data

Sep. 22, 1980 [DE] Fed. Rep. of Germany ....... 3035685

[51] Int. Cl.$^3$ ............................................. E02B 15/04
[52] U.S. Cl. ................................. 210/631; 210/749; 210/925
[58] Field of Search ............... 210/925, 601, 631, 748, 210/747, 749, 922–924; 435/316

[56] References Cited

U.S. PATENT DOCUMENTS

| | | | |
|---|---|---|---|
| 4,224,152 | 9/1980 | Lepain | 210/925 X |
| 4,284,509 | 8/1981 | Lindorfer et al. | 210/925 X |
| 4,286,660 | 9/1981 | Wagner et al. | 435/316 X |
| 4,374,735 | 2/1983 | Lindorfer et al. | 210/925 X |

*Primary Examiner*—Thomas G. Wyse
*Attorney, Agent, or Firm*—Florence U. Reynolds

[57] ABSTRACT

A method and process for preventing the penetration and/or adhesion of hydrocarbons such as crude oil or mineral oil-hydrocarbons into or respectively on objects. The natural and/or constructed objects are sprayed with an aqueous solution and/or dispersion of glycolipids resulting in a thin layer covering the object. A hydrocarbon composition can contact the sprayed object and the resulting hydrocarbon; containing mass can be removed with a pressurized water jet. Various ways exist for degrading or separating the hydrocarbons from the run-off. Preferably the aqueous solution and/or dispersion is treated with ultrasonics before being applied to the surfaces of the objects.

16 Claims, No Drawings

PREVENTION OF PENETRATION OF OILY HYDROCARBONS INTO SAND

BACKGROUND OF THE INVENTION

1. Field of the Invention

The present invention relates to a method and process for preventing the penetration and/or adhesion of hydrocarbons such as crude oil or mineral oil-hydrocarbons into or respectively on objects such as for example soil, sand or man-made objects.

2. Brief Description of the Background of the Invention Including Prior Art

U.S. Pat. No. 4,284,509 solves the problem of removing an oil layer floating on the sea surface by providing for agglomeration of the oil. Thus the oil is transformed into a form wherein it can be removed mechanically. To do this metabolites are placed onto the oil layer floating on the surface of the sea. They reduce the surface tension and the interfacial tension of the oil/aqueous phase system. Such metabolites include amongst others microbially produced glycolipids comprising as hydrophilic component mono-, di- and oligo-saccharides. Such glycolipids essentially induce an agglomeration of the oil floating on the surface of the water.

Furthermore, German Disclosure Document DE-OS No. 28 43 685 teaches a process and apparatus for separating oils or mineral oil-hydrocarbons from solid or solid-liquid materials by mixing these oil containing mixtures with an aqueous solution or dispersion of microbially produced glycolipids to form a slurry and then separating the supernatent oil phase from the aqueous phase.

Thus, both of the above recited processes serve to remove oil from already contaminated water, soil or sand.

SUMMARY OF THE INVENTION

1. Purposes of the Invention

It is an object of the present invention to provide a method of prevention, which will inhibit from the beginning the penetration of oil and/or hydrocarbons into soil, sand and/or objects.

It is another object of the present invention to provide a method for protecting natural and man-made objects against contamination with oil by applying materials which are non-toxic and environmentally sound.

It is a further object of the present invention to provide for removal of oils and hydrocarbons which have been prevented from penetrating by a simple method.

These and other objects and advantages of the present invention will become evident from the description which follows.

2 Brief Description of the Invention

The present invention provides a method for preventing the penetration and/or adhesion of hydrocarbon compositions into or on natural and/or constructed objects by spraying a thin layer of an aqueous solution and/or dispersion of glycolipids on the object.

Glycolipids comprise a carbohydrate moiety and a lipid moiety connected by a covalent linkage.

Following contact of the sprayed natural and/or constructed object with the hydrocarbon composition the hydrocarbon-containing mass resulting from the contact of the hydrocarbon with the sprayed object can be removed with a pressurized water jet. The hydrocarbon containing mass can be separated mechanically from the water. Alternatively, the hydrocarbon containing mass removed with the water jet can be biologically degraded.

The removed hydrocarbon-containing mass and the jet water containing glycolipids can be fed to a larger reservoir. The hydrocarbon-containing masses floating on the reservoir water can be collected and/or sucked off.

The aqueous solution and/or dispersion can be produced from chemically synthesized glycolipids, from microbially synthesized glycolipids and/or from extraction products of biological material. The aqueous solution and/or dispersion can be treated with ultrasonics before spraying on the object.

The aqueous solution and/or dispersion can be produced by adding to water a concentrate of from about 0.1 to 5 g per liter of glycolipids to obtain an application solution having a concentration of from about 0.01 to 1 milligram per liter for the solution to be sprayed.

The spray stream for large scale distribution of the aqueous solution and/or dispersion can be at a flat ascending angle upon spraying from a ground position and at a flat falling angle upon spraying from the air in each case toward the surface to be sprayed. Preferably, the spraying of the aqueous solution and/or dispersion of the glycolipids is performed as a spray mist comprising very fine droplets.

The natural and/or artificial objects can include soil, sand, earthy, stony rocky coast or beach regions, stone or wooden coast or beach reinforcements, port installations, walls, and/or buildings. The hydrocarbon compositions can comprise crude oils, mineral oils, refined oils and hydrocarbon distillation products, synthetic oils and hydrocarbon derivatives.

The invention accordingly consists in the series of steps which will be exemplified in the method and process hereinafter described and of which the scope of application will be indicated in the appended claims.

DESCRIPTION OF INVENTION AND PREFERRED EMBODIMENTS

A process has been found for the prevention of the penetration or adhesion of crude oil or mineral oil-hydrocarbons into or respectively onto soil, sand, or objects by applying aqueous solutions or dispersions of surface active agents according to which the soil, sand or objects before contacting the crude oil or the mineral oil-hydrocarbons are sprayed with a thin layer of an aqueous solution or dispersion of glycolipids and the oil containing mass generated by the contact of the thus prepared soil, sand or objects is splashed off from the surface with a pressurized water jet and, in the case of larger quantities of oil-containing masses, is mechanically separated before the runoff or, in the case of smaller quantities of oil-containing masses, is degraded biologically.

It is surprising that the aqueous solution or dispersion of glycolipids can be placed on the surface and remain on the surface of soil, sand or objects, such as, for example, earthy, stony or rocky coast and bank regions, sandy beaches, stone or wooden coast or bank reinforcements or port installations and buildings close to the coast.

The glycolipids sprayed in an aqueous phase as a thin layer onto the surface of the previously named solid materials, however, prevent the penetration of the later applied crude oils or mineral oil-hydrocarbons into this surface such as the solid attachment of these crude oils or mineral oil hydrocarbons at these surfaces, where it is unimportant if the crude oils or the mineral oil-hydrocarbons arrive as a single phase or in the form of an oil-water mixture at the surfaces of the recited materials treated in accordance with the present invention. Thereby the major part of the arriving oil or oil-water mixture runs off from the cited surfaces and the run-off can be treated in a conventional manner.

In accordance with the present invention, the crude oils or mineral oil-hydrocarbons applied to the surfaces pretreated with glycolipids are splashed off from these surfaces with a pressurized water jet, for which salt water or fresh water can be employed. When the glycolipids are dissolved from the surfaces of the solid materials, presumably the full absorption power of the glycolipids is again released versus the oil phase, which secondarily effects an agglomeration of the crude oils or of the mineral oil-hydrocarbons. The agglomerated oil phase can be collected mechanically from the run-off of the splashed on pressurized water. However, it is also possible to feed the run-off of the pressurized water jet together with the oil phase to a larger water reservoir such as for example into the sea, into the coast water or into lakes and to collect or suck off the supernatent oil-containing mass. Smaller quantities of oil-containing masses splashed off in accordance with the present invention agglomerate to form small drop-like particles surrounded by glycolipids, which after flushing into natural waters are biologically degraded by the microorganisms present there.

The glycolipids to be employed in accordance with the present invention can be produced by chemical or microbial synthesis or by extraction from biological material. Particularly advantageous are glycolipids, which comprise mono- di- or oligo-carbohydrates as the hydrophilic component. The glycolipids produce solutions or dispersions of a lower viscosity as compared with poly-saccharides.

It is advantageous in the performance of the process of the present invention to produce initially an aqueous solution or dispersion containing the glycolipids in a concentration of from 0.1 to 5 g per liter and to add this premixture to the spray water in such quantities that the glycolipids are present in a concentration of from 0.01 to 1 mg per liter. For improving the distribution of the glycolipids in the aqueous medium it has proven useful to treat the aqueous solution or dispersion of the glycolipids with ultrasonics before spraying them.

The aqueous premixture with a content in glycolipids of from 0.1 to 5.0 g per liter can also be added to the spray water from a separate feed line such that the spray jet contains the glycolipids in a concentration of from 0.01 to 1.0 mg per liter.

It is advantageous upon spraying of the aqueous solution or dispersion of glycolipids to be employed according to the invention in a large scale distribution if the spray stream is directed upon spraying from the ground in a flat, ascending angle direction and upon spraying from the air in a flat falling angle direction onto the surfaces to be treated. This causes the aqueous solution or dispersion of the glycolipids impinge upon the surfaces to be treated with limited kinetic energy and momentum such that it adheres substantially to the surfaces of the same or penetrates only to a slight depth and thus prevents penetration the oncoming oil.

The spraying of the solutions or dispersions to be applied in accordance with the invention can be performed by means of movable spray apparatus, which is installed upon terrestrial vehicles, boats or aircraft.

A particularly uniform and fine distribution of the glycolipid solutions or dispersions to be applied according to the present invention can be achieved on the surfaces to be treated, if the spray stream is distributed as a spray mist comprising very fine droplets.

In order to assure a rapid realization of the process in accordance with the present invention, depots with solid glycolipids, preferably in the form of their concentrates, can be provided at endangered locations, especially near the travel routes of oil tankers or in harbors or the like, so that they can be applied in time in accordance with the present invention upon notification of the occurence of an oil spill.

The invention allows to prevent prophylactically the penetration or the adhesion of crude oil or mineral oil-hydrocarbons into or respectively on the surfaces of soil, sand and rocks and stone formations as well as into or respectively on buildings made from stone, concrete or wood, which serve in particular for covering and reinforcing bank surfaces or harbors. If crude oil or mineral oil-hydrocarbons from adjacent waters contact the surfaces pretreated in accordance with the invention, then the invention provides the technically advantageous possibility, to splash the oils off simply with pressurized water and, if desirable, to separate them from the water mechanically. In the case of minor quantities of crude oil or mineral oil-hydrocarbons, there is the additional technical advantage that the glycolipids surrounding the oil droplets, being metabolites of microorganisms, favor the use of the oil by the microorganisms especially present in sea water in so far as they can serve these microorganisms as an easily available source of carbon. The process according to the present invention furthermore employs only naturally occurring non-toxic materials, such that a long term disturbance of the ecological equilibrium is avoided at the treated surface.

It thus will be seen that there is provided a method which achieves the various objects of the invention and which is well adapted to meet the conditions of practical use.

As various possible embodiments might be made of the above invention, and as various changes might be made of the above embodiment set forth, it is to be understood that all matter herein described is to be interpreted as illustrative and not in a limiting sense.

What is claimed is:

1. A method for preventing the penetration of an oily hydrocarbon composition into dry or moist sand comprising the step of spraying the sand with a thin layer of an aqueous solution or dispersion of glycolipids, whose hydrophilic component comprises a dicarbohydrate, prior to contact of the hydrocarbon composition with the sand.

2. The method according to claim 1, further comprising the steps of contacting the sprayed sand with the hydrocarbon composition; and removing a hydrocarbon-containing mass resulting from the contact of the hydrocarbon with the sprayed sand by means of a pressurized water jet.

3. The method according to claim 2, further comprising the step of mechanically separating the hydrocarbon-containing mass from the water.

4. The method according to claim 2, further comprising the step of biologically degrading the hydrocarbon-containing mass removed with the water.

5. The method according to claim 2, further comprising the step of feeding the removed hydrocarbon-containing mass and the jet water containing glycolipids to a water reservoir.

6. The method according to claim 5, further comprising the step of collecting the hydrocarbon-containing mass floating on the surface of the reservoir.

7. The method according to claim 5, further comprising the step of sucking off the hydrocarbon-containing mass from the reservoir.

8. The method according to claim 1, wherein the glycolipids are chemically synthesized glycolipids.

9. The method according to claim 1, wherein the glycolipids are microbially synthesized glycolipids.

10. The method according to claim 1, wherein the aqueous solution or dispersion of the glycolipids is produced from extraction products of biological material.

11. The method according to claim 1, further comprising the step of treating the aqueous solution or dispersion with ultrasonics before spraying.

12. The method according to claim 1, wherein the aqueous solution or dispersion of glycolipids is produced by adding to water a concentrated solution or dispersion of from about 0.1 to 5 g per liter of glycolipids to obtain an application solution having a concentration of from about 0.01 to 1 milligram per liter for the solution to be sprayed.

13. The method according to claim 1, wherein the aqueous solution or dispersion is sprayed from a ground position at a flat ascending angle toward the object to be sprayed.

14. The method according to claim 1, wherein the aqueous solution or dispersion is sprayed from an aerial position at a flat falling angle toward the object to be sprayed.

15. The method according to claim 1, wherein the aqueous solution or dispersion of the glycolipids is sprayed as a mist comprising very fine droplets.

16. The method according to claim 1, wherein the oily hydrocarbon composition is selected from the group consisting of crude oils, mineral oils, refined oils, synthetic oils and hydrocarbon distillation products.

* * * * *